United States Patent [19]

Covey et al.

[11] Patent Number: 4,523,850
[45] Date of Patent: Jun. 18, 1985

[54] SYSTEM FOR POSITIONING A BODY

[75] Inventors: Robert L. Covey, Cranbury, N.J.; Michael T. Gale, Wettswill, Switzerland

[73] Assignee: RCA Corporation, Princeton, N.J.

[21] Appl. No.: 434,316

[22] Filed: Oct. 14, 1982

[51] Int. Cl.³ ............................................. G05D 1/10
[52] U.S. Cl. .................................... 356/375; 356/400; 250/561
[58] Field of Search ...................... 356/399, 400, 375; 33/286; 250/561

[56] References Cited

U.S. PATENT DOCUMENTS

| | | | |
|---|---|---|---|
| 3,718,823 | 2/1973 | Niikura et al. | 250/223 |
| 3,947,129 | 3/1976 | Wiklund | 356/159 |
| 4,054,388 | 10/1977 | Marsh et al. | 356/172 |
| 4,114,034 | 9/1978 | Hunka | 250/202 |
| 4,341,472 | 7/1982 | Gorog et al. | 356/399 |

Primary Examiner—R. A. Rosenberger
Assistant Examiner—Michael F. Vollero
Attorney, Agent, or Firm—Birgit E. Morris; Donald S. Cohen; Joseph D. Lazar

[57] ABSTRACT

A system for positioning a body having two opposed edges and having a first axis oriented to pass through the two edges. A beam of light oriented along a second axis orthogonal to the first axis images one or both of the edges onto all or a portion of a photodetector array which is aligned in a direction parallel to the first axis. The array is scanned to obtain a light intensity transition profile of all or part of the projected image whereby the profile has either one or two 50% intensity points. The body is then shifted until both of the 50% intensity points strike predetermined locations on the array indicating that both the edges are included in the image. The body is shifted along the first axis until the fifty percent (50%) intensity point along the transition profile strikes a predetermined location along the photodetector array. The body is also moved along the second axis until the slope of the intensity transition profile is maximized, thereby obtaining an in-focus position. The body is then translated along a third axis, substantially orthogonal to the first and the second axes, until the minimum in the intensity transition profile drops to a predetermined percent of the full intensity value.

17 Claims, 7 Drawing Figures

SYSTEM FOR POSITIONING A BODY

This invention relates to a system for positioning a body such as the tip of a stylus.

BACKGROUND OF THE INVENTION

Information playback systems frequently utilize a stylus for reading signals from the surface of an information record, typically a plastic disc, that contains stored video and audio information. In some systems the information record has a fine spiral groove to guide the tip of a stylus that contains a thin electrode. In these systems the stylus is typically made from natural or synthetic diamond by several critical shaping and lapping processes, normally referred to as micromachining. The stylus tip is tapered to form the prow of the tip, and is also lapped to form a keel having a V-shaped shoe for its bottom portion. This keel-shaped tip has a shoe length of about 3 to 5 micrometers and a thickness of about 2 micrometers. These micromachining steps are normally performed while the stylus is mounted on an arm attached to a cartridge, wherein the arm is capable of flexible movement with respect to the cartridge.

In manufacturing stylus tips for use in such video disc playback systems, the tip of the diamond stylus is inspected at various stages in the fabrication of the stylus. Optical inspection or measurement after prismatic coning, faceting or keel lapping first requires that the stylus tip be accurately positioned at the center of the field of view of a microscope or other optical system. Since the field of view of a high-power optical microscope having 1000× to 1500× magnification is so small, it is laborious and time consuming to bring the stylus tip into focus by manual adjustments. One possible method for facilitating alignment of the stylus tip is to insert the tip into a conical or grooved structure, made of glass, for guiding the tip into the field of view. An index-matching immersion oil is utilized to permit high-resolution examination of the tip through the glass structure. Such a method not only raises the possibility of mechanical damage during the alignment, but necessitates removal of the immersion oil after the inspection has been made. Also, in certain applications, manufacturing tolerances are such that the required degree of positioning accuracy cannot be achieved by locating the stylus arm or cartridge against mechanical stops.

An optical method and apparatus for positioning a tapered body is described in U.S. Pat. No. 4,341,472 issued to I. Gorog, M. A. Leedom and J. P. Wittke on July 27, 1982, and assigned to RCA Corporation. For maximum image intensity, the preferred body illumination is in transmission, with the illuminating and imaging optics on opposite sides of the body. The above-mentioned patent discloses a technique for positioning a body having a tapered profile when viewed along a first axis. The technique includes exposing the body to a first beam of light oriented along the first axis in a manner such that the tapered profile is projected as a first image onto a first linear array of photodetectors disposed along a direction orthogonal to both the first axis and the direction of the taper. The body is exposed to a second beam of light oriented along a second axis orthogonal to the first axis in a manner such that a second profile of the body is projected as a second image onto a second linear array of photodectors disposed along a direction parallel to the first axis. The body is then moved along the first and the second axes until the first and the second images strike predetermined locations along the first and second photodetector arrays. The location of the body is also changed along a third axis, orthogonal to the first and the second axes, until the width of the first image equals a predetermined width measured by the linear magnitude of the first image along the first photodetector array. Free access to both sides of the body is thus required in the two orthogonal directions. In many applications, however, access is restricted to one linear direction by the surrounding stylus cartridge or mounting or the processing equipment. An example is the inspection or measurement of the stylus in its cartridge assembly, as required at the keel lapping stage.

The present invention uses only a single photodetector array and requires free access only in one direction. The novel system enables a body, such as the tip of a stylus, to be accurately and automatically positioned within a volume of space having dimensions in the order of one micrometer.

SUMMARY OF THE INVENTION

The present invention comprises a system for positioning a body having two opposed edges and having a first axis oriented to pass through the two edges. A beam of light oriented along a second axis orthogonal to the first axis images one or both of the edges onto all or a portion of a photodetector array which is aligned in a direction parallel to the first axis. The array is scanned to obtain a light intensity transition profile of all or part of the projected image whereby the profile has either one or two 50% intensity points. The body is then shifted until both of the 50% intensity points strike predetermined locations on the array indicating that both the edges are included in the image. The body is shifted along the first axis until the fifty percent (50%) intensity point along the transition profile strikes a predetermined location along the photodetector array. The body is also moved along the second axis until the slope of the intensity transition profile is maximized, thereby obtaining an in-focus position. The body is then translated along a third axis, substantially orthogonal to the first and the second axes, until the minimum in the intensity transition profile drops to a predetermined percent of the full intensity value.

DETAILED DESCRIPTION OF THE PREFERRED EMBODIMENT

Figure 1:
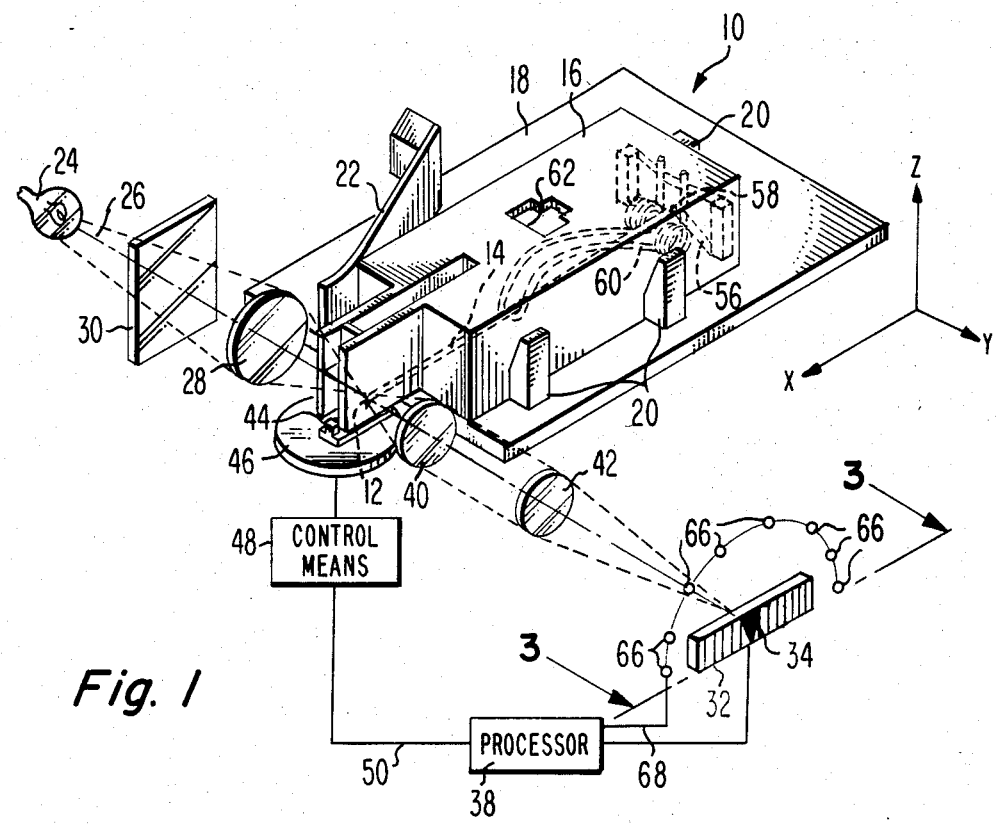
FIG. 1 is a perspective diagrammatic view illustrating the present novel system.

In FIG. 1 of the drawing, there is shown one embodiment of an apparatus 10 utilized for positioning an opaque body which may comprise a tip 12 of a stylus mounted at the end of an arm 14. In the present example, the arm 14 is flexibly attached to a video disc player cartridge 16, which is seated on a stationary base plate 18 between three locating pins 20 and a leaf spring 22. The stylus tip 12 has a first axis oriented along an edge of the tip 12. In the present embodiment, the first axis is located along the shoe length of the stylus tip 12 and is oriented along the x direction, as shown in FIG. 1. The stylus tip 12 usually includes a prow terminating at a base thereof and a stem remote from the prow, and is adapted to track a path along a surface of an information record and to measure capacitive variations between the stylus and the surface of the record when relative motion is established between the stylus and the record. The shoe length of the stylus tip 12 comprises the distance between the base and the stem along a line tangent to the path at the tracking location.

The apparatus 10 comprises a light source 24 positioned to expose the stylus tip 12 to a beam 26 of light oriented along a second axis substantially orthogonal to the first axis (x direction) in a direction such that the edge is imaged by an optical system. The second axis is oriented along the y direction, as illustrated in FIG. 1. In the present embodiment, the light source 24 comprises a 100 watt quartz-halogen incandescent lamp. A fiber-optic light guide (not shown) may be used if it is desirable to remove the housing of the light source 24 from the vicinity of the stylus tip 12 for space considerations. Preferably, a condenser lens 28 is disposed between the light source 24 and the stylus tip 12 for forming a uniform high-density light spot in the region of the tip 12. In the present embodiment, the condenser lens 28 is a 10× 0.25 NA (Numerical Aperture) microscope objective. In addition, a heat filter 30, with a cutoff at $\lambda=0.75$ $\mu$m, may be placed between the light source 24 and the condenser lens 28 for minimizing heating and thermal expansion effects of the stylus tip 12 by removing unwanted infrared wavelengths.

The apparatus 10 further comprises a linear array 32 of photodetectors disposed along a direction substantially parallel to the first axis (x direction) in a position such that a linear section across the stylus tip 12 is projected by the optical system, as a silhouette-like image 34, onto the photodetector array 32. The apparatus 10 also includes means for scanning the photodetector array 32 to obtain a light intensity transition profile 36, illustrated in FIGS. 4 through 7, of the projected image 34 along the photodetector array 32. The scanning means may be part of a processor 38, connected to the photodetector array 32, which generates an output signal in response to the light intensity transition profile 36. Preferably, the photodetector array 32 is controlled and sampled by a "SKIP" (Serial Kamera Interface Processor) processor board in a 4-slot Intel System chassis. In the present embodiment, the photodetector array 32 comprises a scanning photodiode array containing up to 1,728 individual elements or photodiodes, each 16 micrometers high and spaced 15 micrometers apart, which are electronically scanned and sampled with a repetition period of about 30 milliseconds. The array 32 is about 25 millimeters long. Such an array 32 is available as an integrated circuit-type package with a ground and polished quartz window, commercially available as RL1728H from EG&G Reticon, Sunnyvale, Calif.

The optical system of the present apparatus 10 includes a long-working distance (LWD) objective lens 40 and an eyepiece lens 42 disposed between the stylus tip 12 and the photodetector array 32 for magnifying and focusing the image 34 of the tip 12 onto the photodetector array 32. The LWD objective lens 40 must have a working distance sufficiently large to clear the side of the cartridge 16, which is approximately 5 millimeters from the stylus tip 12. The LWD lens 40 should have a numerical aperture (NA) in the range of 0.4 to 0.5 and a power from 20× to 50×. In the present example, a Bausch & Lomb 50× 0.45 NA objective has been found to give good results and is very convenient because of its extraordinarily long working distance of 12.5 millimeters. A 5× or 10× eyepiece lens 42 is used to project an erect image 34 of the side of the stylus tip 12 onto the photodetector array 32. The combination of the LWD objective lens 40 and the 10× eyepiece lens 42 gives a non-inverted image 34 with a magnification of about 200× in the plane of the photodetector array 32. Thus, an individual Reticon element corresponds to an approximate square about 750 Angstroms on a side in the plane of the stylus tip 12.

The apparatus 10 further comprises means for shifting the stylus tip 12 along the first axis (x direction), means for moving the tip 12 along the second axis (y direction), and means for translating the tip 12 along a third axis, substantially orthogonal to the first axis (x direction) and the second axis (y direction). The third axis is oriented along the z direction, as illustrated in FIG. 1. In the present embodiment, the apparatus 10 also includes a fixture 44 supported on a translational stage 46 adapted for positioning the arm 14. The means for shifting, moving and translating the stylus tip 12 comprise control means 48 for driving the translational stage 46 in directions oriented along the first (x direction), second (y direction) and third (z direction) axes. The translational stage 46 is actually driven by three stepping motors which step in 1 micrometer intervals and, preferably, have a maximum step rate of 1000/second, with a repeatability of 1 micrometer. The stepping motors utilized are standard units commercially available from Ardel Kinematic, College Point, N.Y. In the present example, the apparatus 10 also includes circuit means 50 for transmitting the output signal, generated by the processor 38, to the control means 48 in a manner such that the translational stage 46 is automatically driven.

Figure 2:
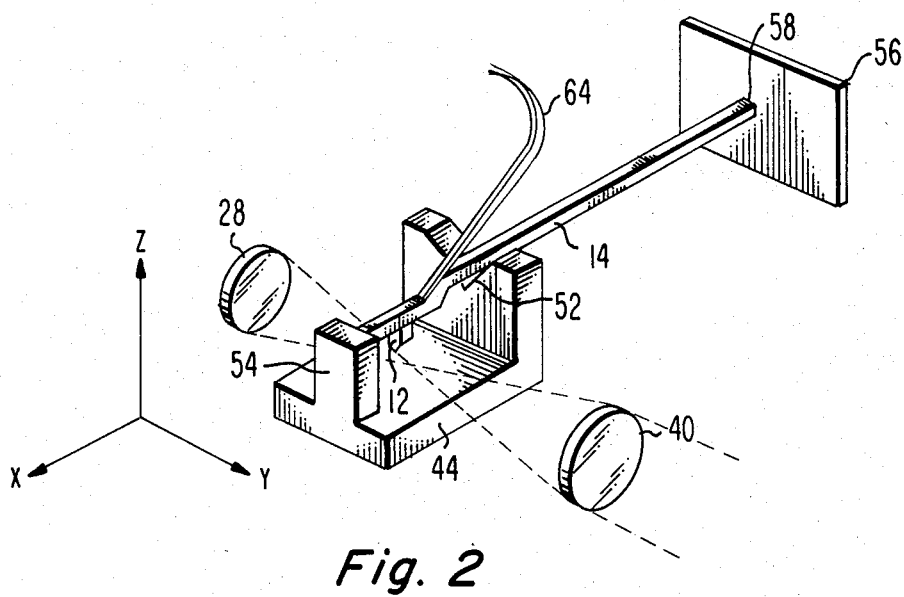
FIG. 2 is an enlarged perspective view of a portion of FIG. 1 illustrating the novel system at the stylus location.

Preferably, the fixture 44 has a V-shaped groove 52 positioned to guide the arm 14 in directions oriented along the second (y direction) and third (z direction) axes, as shown in FIG. 2 of the drawing. The V-shaped groove 52 is disposed upright in a first vertical wall oriented along a plane orthogonal to the first direction (x direction) at one end of the fixture 44. The groove 52 is positioned beneath the cartridge 16 in order to receive the arm 14 as it is lowered thereinto. The fixture 44 also has an end stop 54 comprising a second vertical wall, parallel to the first wall, disposed at the other end of the fixture 44 and positioned to push against the end of the arm 14 in a direction oriented along the first axis (x direction). In the present example, the arm 14 is suspended within the body of the cartridge 16 by means of a flexible rubber diaphragm 56 supported within the cartridge 16, which is attached to the end 58 of the arm 14 opposite the end holding the stylus, as illustrated in FIG. 2. A U-shaped clamping spring 60, shown in FIG. 1, releasably clamps the arm 14 in a retracted position in the cartridge 16. Typically, the cartridge 16 has an opening 62 in the top thereof through which a spring defeat lever (not shown) may enter the interior of the cartridge 16 and depress the clamping spring 60, thereby allowing the arm 14 to lower the stylus, which is guided by a conductive flylead spring 64 secured thereto.

The preferred embodiment of the apparatus 10 also comprises a plurality of discrete photodetectors 66 positioned in a semicircle of about 4 centimeters radius disposed above and centered about the photodetector array 32 along a plane substantially orthogonal to the second axis (y direction), as shown in FIG. 1 of the drawing. The preferred apparatus 10 also includes circuit means 68 for sending alignment signals generated by the discrete photodetectors 66 to the control means 48 for driving the translational stage 46 in a manner such that the projected image 34 intersects the photodetector array 32. In the present example, eight discrete photodiodes (UDT PIN-5DP) are utilized for the discrete photodetectors 66. The purpose of the discrete photodetectors 66 is to sense any projected image 34 which initially does not fall directly upon the photodetector array 32, and to provide appropriate positioning information to move the image 34 to the center of the field of view (FOV) so that the image 34 intersects the photodetector array 32.

The method of positioning the stylus tip 12 initially comprises the procedure of seating the cartridge 16 on the base plate 18 between the three locating pins 20 and the leaf spring 22. Preferably, a spring defeat lever (not shown) enters the interior of the cartridge 16 through the opening 62 in the top and depresses the clamping spring 60, thereby allowing the arm 14 to drop into the V-shaped groove 52 of the fixture 44 supported on the translational stage 46. The actual loading procedure is facilitated by pulling back the fixture 44 by about 0.2 millimeter in the $-x$ direction, dropping the arm 14 into the V-shaped groove 52, and returning the fixture 44 to the starting position with the end stop 54 now pressing against the end of the arm 14. This procedure is capable of locating the stylus tip 12 of typical manufactured cartridges to within a cubic volume having a side length of about 250 micrometers. This is sufficient to bring the stylus tip 12 within the 3-dimensional field of view of the optical system.

At this point, an out-of-focus image 34 of the stylus tip 12 appears at the plane of the discrete photodetectors 66. The blurred image 34 may not intersect the photodetector array 32 but, if the appropriate dimensions have been chosen correctly, will fall on one or more of the discrete photodetectors 66. The discrete photodetectors 66 then generate alignment signals which are sent, via the circuit means 68 and the processor 38, to the control means 48 for driving the translational stage 46 in a manner such that the projected image 34 is moved to the center of the optical field of view, thereby, causing the image 34 to intersect, and be sensed by, the photodetector array 32. In actual operation, an acquisition and focus algorithm first seeks and recognizes the stylus tip 12, or the dark-to-light transition on the array 32 signal. For example, if the entire array 32 is dark, the stylus tip 12 is moved vertically (+z direction) until light is seen. If the entire array 32 is illuminated, the discrete photodetectors 66 are sampled until one is located that is dark, and the stylus tip 12 moved accordingly. The mechanical arrangement of the cartridges 16 is designed so that, upon insertion of a cartridge 16 and lowering of the stylus arm 14, the image 34 of the stylus tip 12 always obscures either part of the array 32 or one of the discrete photodetectors 66.

Figure 3:
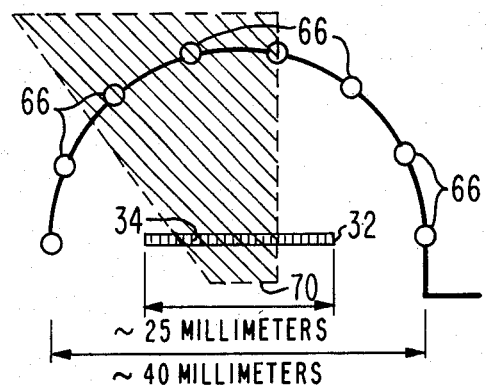
FIG. 3 is a cross-sectional view taken along line 3—3 of FIG. 1.
Figure 4:
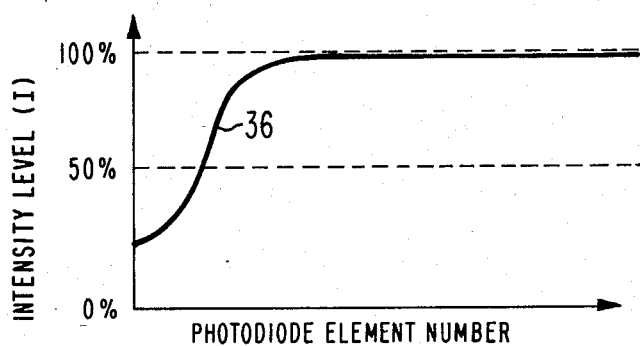
FIGS. 4 through 7 are diagrams of the light intensity profile along the photodetector array at different steps of the novel method.
Figure 5:
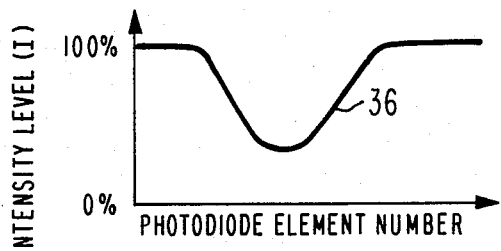

The stylus tip 12 is now exposed to the beam 26 of light in a manner such that an edge of the tip 12 is imaged by the light beam 26 and a linear section across the tip 12 is projected as the silhouette-like image 34 onto the photodetector array 32, as shown in FIG. 3 of the drawing. In the present example, the selected edge of the stylus tip 12 is located along the shoe length of the tip 12, and is illustrated as edge line 70 in FIG. 3. The photodetector array 32 is scanned to obtain the light intensity transition profile 36 of the projected image 34 along the photodetector array 32. By way of example, the intensity transition profile 36 may look like the profile 36 shown in FIG. 4 of the drawing. Based upon such a profile 36, the stylus tip 12 is first shifted along the first axis (x direction) until the fifty percent (50%) intensity point along the transition profile 36 strikes a predetermined location along the photodetector array 32, in order to roughly center the out-of-focus image 34 along the array 32, as shown in FIG. 5. The real edge position theoretically corresponds to the 50 percent intensity point on the transition profile 36.

Figure 6:
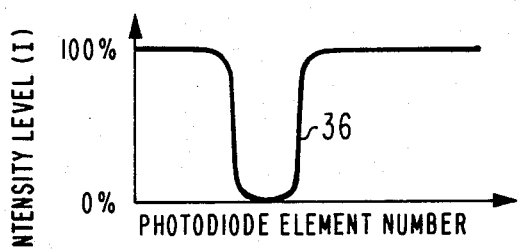

The stylus tip 12 is then moved along the second axis (y direction) until the slope of the intensity transition profile 36 is maximized, as illustrated in FIG. 6. By maximizing the slope, using a suitable sequence of slope measurements and small translation movements, an accurate in-focus image 34 is obtained, i.e., one which has a sharpened edge line. Preferably, the edge line width is less than 10 Reticon elements, or 0.75 micrometer.

Figure 7:
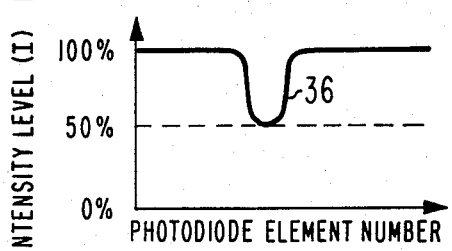

The stylus tip 12 is finally translated along the third axis (z direction) until the minimum in the intensity transition profile 36 drops to a predetermined percent of the full intensity value. In the present example, the tip 12 is translated along the third axis until the minimum in the transition profile 36 drops to fifty percent (50%) of the full intensity value, as shown in FIG. 7. The stylus tip 12 is now precisely positioned along all three axes to an accuracy of about one micrometer.

In the present embodiment, the above-described shifting, moving and translating steps are actually performed by driving the translational stage 46, and supported fixture 44, in directions oriented along the first, second and third axes. Preferably, an output signal, generated by the processor 38 in response to the light intensity transition profile 36, is automatically transmitted via the circuit means 50 to the control means 48 for driving the translational stage 46. With suitable electronics and microprocessor control, the shifting, moving and translating steps can be performed rapidly and fully automatically in a number of seconds. The present system is particularly suitable for positioning small nontapered bodies, having the dimensions of a video disc stylus tip, with a single beam of light to a precision of about one micrometer along all three axes.

What is claimed is:

1. A method of positioning a body having two opposed edges and having a first axis oriented to pass through said edges, comprising the steps of:
    exposing said body to a beam of light oriented along a second axis substantially orthogonal to said first axis in a direction such that one or both of said edges are imaged by an optical system for projecting a linear section across said body as a silhouette-like image onto all or a portion of a linear array of photodetectors disposed along a direction substantially parallel to said first axis,
    scanning said photodetector array to obtain a light intensity transition profile of all or part of said projected image along said photodetector array, said profile having one or two fifty percent (50%) intensity points,
    shifting said body along said first axis until both of the fifty percent (50%) intensity points along said transition profile strike predetermined locations along said photodetector array, said profile being indicated by a projected image comprising both of said edges, moving said body along said second axis until the slope of said intensity transition profile is maximized, thereby obtaining an in-focus position, and translating said body along a third axis, substantially orthogonal to said first and said second axes, until the minimum in said intensity transition profile drops to a predetermined percent of the full intensity value.

2. A method as recited in claim 1 wherein said body comprises a tip of a stylus mounted on an arm positioned by a fixture supported on a translational stage, and wherein said shifting, said moving and said translating steps are performed by driving said translational stage in directions oriented along said first, said second and said third axes.

3. A method as recited in claim 2 wherein said arm is flexibly attached to a cartridge seated on a base plate disposed adjacent said fixture, said fixture having a V-shaped groove positioned to guide said arm in directions oriented along said second and said third axes, and also having an end stop positioned to push against the end of said arm in a direction oriented along said first axis, and wherein said exposing step is performed by lowering said arm into said V-groove and allowing the end of said arm to press against said end stop, whereat said tip is exposed to said light beam.

4. A method as recited in claim 2 wherein said scanning step is performed by a processor connected to said photodetector array, and wherein said method further comprises the step of transmitting an output signal, generated by said processor, to control means for driving said translational stage in a manner such that said shifting, said moving and said translating steps are automatically performed.

5. A method as recited in claim 4 wherein said predetermined percent is fifty percent (50%) of the full intensity value.

6. A method as recited in claim 4 wherein said optical system comprises a long-working distance (LWD) objective lens and an eyepiece lens disposed between said tip and said photodetector array.

7. A method as recited in claim 6 wherein a plurality of discrete photodetectors are positioned in a semicircle disposed above and centered about said photodetector array along a plane substantially orthogonal to said second axis, and wherein said method further comprises the step of sending alignment signals generated by said discrete photodetectors to said control means for driving said translational stage in a manner such that said image intersects said photodetector array.

8. A method as recited in claim 7 wherein said light beam emanates from an incandescent lamp and passes through a heat filter for removing unwanted infrared wavelengths, and wherein said photodetectors comprise photodiodes.

9. A method as recited in claim 8 further comprising the step of forming a uniform high-intensity light spot in the region of said tip by utilizing a condenser lens disposed between said incandescent lamp and said tip.

10. An apparatus for positioning a body having two opposed edges and having a first axis oriented to pass through said edges, comprising:

a light source positioned to expose said body to a beam of light oriented along a second axis substantially orthogonal to said first axis in a direction such that one or both of said edges are imaged by an optical system, a linear array of photodetectors disposed along a direction substantially parallel to said first axis in a position such that a linear section across said body is projected by said optical system, as a silhouette-like image, onto all or a portion of said photodetector array, means for scanning said photodetector array to obtain a light intensity transition profile of said projected image along said photodetector array, said profile having one or two fifty percent (50%) intensity points, means for shifting said body along said first axis to allow both of the fifty percent (50%) intensity points along said transition profile to strike predetermined locations along said photodetector array, means for moving said body along said second axis to allow the slope of said intensity transition profile to be maximized, thereby obtaining an in-focus position, and means for translating said body along a third axis, substantially orthogonal to said first and said second axes, to allow the minimum in said intensity transition profile to drop to a predetermined percent of the full intensity value.

11. An apparatus as defined in claim 10 further comprising a fixture supported on a translational stage adapted for positioning an arm having a stylus mounted thereon, said body comprising a tip of said stylus, and wherein said means for shifting, moving and translating said tip comprise control means for driving said translational stage in directions oriented along said first, said second and said third axes.

12. An apparatus as defined in claim 11 wherein said fixture has a V-shaped groove positioned to guide said arm in directions oriented along said second and said third axes, and also has an end stop positioned to push against the end of said arm in a direction oriented along said first axis.

13. An apparatus as defined in claim 11 wherein said means for scanning said photodetector array comprises a processor connected to said photodetector array, and wherein said apparatus further comprises means for transmitting an output signal, generated by said processor, to said control means in a manner such that said translational stage is automatically driven.

14. An apparatus as defined in claim 13 wherein said optical system comprises a long-working distance (LWD) objective lens and an eyepiece lens disposed between said tip and said photodetector array for magnifying and focusing said image of said tip onto said photodetector array.

15. An apparatus as defined in claim 14 further comprising a plurality of discrete photodetectors positioned in a semicircle disposed above and centered about said photodetector array along a plane substantially orthogonal to said second axis, and also comprising means for sending alignment signals generated by said discrete photodetectors to said control means for driving said translational stage in a manner such that said image intersects said photodetector array.

16. An apparatus as defined in claim 15 wherein said light source comprises an incandescent lamp, wherein said photodetectors comprise photodiodes, and wherein said apparatus further comprises a heat filter disposed between said incandescent lamp and said tip for removing unwanted infrared wavelengths.

17. An apparatus as defined in claim 16 further comprising a condenser lens disposed between said incandescent lamp and said tip for forming a uniform high-density light spot in the region of said tip.

* * * * *